United States Patent [19]

Diehl et al.

[11] Patent Number: 5,204,008
[45] Date of Patent: Apr. 20, 1993

[54] PROCESS FOR THE DETOXIFICATION OF AQUEOUS SOLUTIONS CONTAINING CYANOHYDRINS AND/OR NITRILES

[75] Inventors: Manfred Diehl, Frankfurt; Joachim Fischer, Rodenbach; Hubert Wolf, Hammersbach, all of Fed. Rep. of Germany

[73] Assignee: Degussa Aktiengesellschaft, Frankfurt am Main, Fed. Rep. of Germany

[21] Appl. No.: 858,001

[22] Filed: Mar. 26, 1992

[30] Foreign Application Priority Data

Mar. 27, 1991 [DE] Fed. Rep. of Germany ....... 4110056

[51] Int. Cl.$^5$ .............................................. C02F 1/72
[52] U.S. Cl. .................................. 210/759; 210/763; 210/904
[58] Field of Search ................. 210/759, 763, 722, 904

[56] References Cited

U.S. PATENT DOCUMENTS

| | | | |
|---|---|---|---|
| 3,715,309 | 2/1973 | Zumbrunn et al. | 210/759 |
| 3,835,047 | 9/1974 | Colin | 210/759 |
| 3,929,636 | 12/1975 | Zumbrunn et al. | 210/759 |
| 3,970,554 | 7/1976 | Fisher et al. | 210/62 |
| 4,743,381 | 5/1988 | Bull | 210/759 |

FOREIGN PATENT DOCUMENTS 0223904 3/1990 European Pat. Off. .

Primary Examiner—Stanley S. Silverman
Assistant Examiner—Neil M. McCarthy
Attorney, Agent, or Firm—Beveridge, DeGrandi, Weilacher & Young

[57] ABSTRACT

A process is disclosed for the detoxication of aqueous solutions which contain cyanohydrins, in particular glycol nitrile, and/or nitriles and in addition contain decomposition catalyst for peroxide compounds, in particular manganese compounds, by perhydrolysis of the cyano compounds at temperatures of from 5° to 80° C. and pH values of from 8 to 12 by means of one or more peroxide compounds which are alkali metal percarbonates and perborates of alkali metals and alkaline earth metals and alkaline earth metal peroxides. The peroxide compounds are added as such to the solution to be detoxified or formed in situ in the solution to be detoxified. Sodium percarbonate is preferably used.

9 Claims, No Drawings

PROCESS FOR THE DETOXIFICATION OF AQUEOUS SOLUTIONS CONTAINING CYANOHYDRINS AND/OR NITRILES

BACKGROUND OF THE INVENTION

This invention relates to a process for the detoxification of aqueous solutions which contain cyanohydrins, in particular glycolonitrile, and/or nitriles and in addition contain decomposition catalysts for peroxide compounds, in particular manganese compounds, by perhydrolysis of the cyano compounds with peroxide compounds.

Effluents containing cyanides and/or cyanohydrins or nitriles may be detoxified by the process according to U.S. Pat. No. 3,970,554 comprising the addition of peroxide compounds at temperatures of from 10° to 80° C. and pH values of from 6 to 12 in the presence of iodide ions and optionally silver ions. Hydrogen peroxide is mentioned as the preferred peroxide compound. Although perborates, percarbonates and peroxides are also described as effective in the said document, a comparison of Test 10 (Example 2) with Test 25 (Example 7) shows the superiority of hydrogen peroxide over perborate, since the perborate required three times as long to lower the cyanide content to below 0.1 mg/l.

It has been found that effluents containing glycolo nitrile, such as those obtained, for example, when exhaust gases containing hydrogen cyanide are scrubbed in the presence of formaldehyde, cannot be satisfactorily detoxified with hydrogen peroxide if manganese compounds are present at the same time. In the metallurgical industry, the process according to EP-B 0 223 904 is used for the purification of blast furnace gases. In this process, formaldehyde is introduced into the gas scrubbing circuit to form glycolo nitrile and the glycolonitrile formed is subjected to perhydrolysis by means of hydrogen peroxide. In the treatment of the wash waters from the production of ferromanganese, vigorous decomposition of hydrogen peroxide takes place due to the presence of the manganese in the wash water so that complete perhydrolysis cannot be achieved or only by using very large excesses of $H_2O_2$. Under these conditions, however, it is questionable whether the process of purification of exhaust gas/effluent is economical and the officially allowed limits of toxic materials may not even be achieved. The previously known detoxication of aqueous solutions containing cyanohydrins and/or nitriles may be impaired in its effectiveness and economical efficiency not only by Mn compounds but also by the presence of other decomposition catalysts for peroxide compounds, in particular copper compounds and active charcoal.

In the process of "perhydrolysis", the cyanohydrins and nitriles are converted into the non-toxic hydroxycarboxylic acids or carboxylic acids from which the cyanohydrins or nitriles are derived, for example glycolo nitrile is converted into a hydroxy-acetamid and glycollic acid. The hydroxycarboxylic acids and carboxylic acids may be further decomposed in known manner by peroxide compounds or by biological degradation. The cyanohydrin content in aqueous solutions may be determined by means of cyanide determination processes in which the cyanohydrin is decomposed into the carbonyl compounds and HCN and the latter is removed from the equilibrium for determination of the cyanide, for example by alkalization to a pH>12 and argentometric titration with potentiometric indication of the end point. The nitriles may be determined by, for example, chromatographic processes.

SUMMARY OF THE INVENTION

It is an object of the present invention to provide a process for the detoxification of aqueous solutions which contain cyanohydrins and/or nitriles each having 2 to 5 carbon atoms, in particular glycolonitrile, and which in addition contain decomposition catalysts for peroxide compounds, in particular manganese compounds such as Mn(II) salts and $MnO_2$, by perhydrolysis of the cyano compounds with peroxide compounds at temperatures of from 5° to 80° C. and pH values of from 8 to 12. The process of the invention enables more extensive detoxication to be achieved and/or requires a smaller quantity of peroxide compounds to be added into the process and/or can be completed within a shorter reaction time than has hitherto been possible in the known processes using hydrogen peroxide.

In achieving the above and other objects, one feature of the invention resides in using one or more peroxide compounds selected from the group consisting of alkali metal percarbonates and perborates of alkali metals and/or alkaline earth metals and alkaline earth metal peroxides for perhydrolysis, the said peroxide compounds being added to the solution to be detoxified in a solid form or dissolved or suspended in water or formed in situ in the said solution from hydrogen peroxide and the other components selected from the group of the metaborate, alkali metal and alkaline earth metal ions.

The cyanohydrins to be detoxified are reaction products of aldehydes or ketones having 1 to 4 carbon atoms and hydrogen cyanide. In an alkaline medium, the reactants are in equilibrium with the cyanohydrin. The aqueous solutions containing cyanohydrins and in addition containing manganese compounds may be obtained, for example, from processes of washing blast furnace gases of the metallurgical industry and flue gases from refuse combustion plants or they may be obtained from effluents resulting from processes of the chemical industry.

Efficient and economical detoxication of solutions containing glycolonitrile such as result from washing processes according to EP-B 0 223 904 or similar processes is of the greatest technical importance. Effluents containing nitriles may also be obtained from the synthesis of nitriles.

DETAILED DESCRIPTION OF THE PREFERRED EMBODIMENTS

The perborates used in the process according to the invention may be alkali metal perborates such as sodium perborate, in particular in the form of the so-called monohydrate ($NaBO_3.H_2O$) and tetrahydrate ($NaBO_3.4H_2O$), potassium perborate hydrate ($KBO_3.nH_2O$ where n=0.2 to 1) and so-called superoxidized sodium perborate containing more than 16% of active oxygen, and the alkaline earth metal perborates, in particular magnesium and calcium perborate. These perborates may be added in solid form or as solutions or suspensions or they may be formed in situ in the solutions to be detoxified from hydrogen peroxide added to the solution and a source of metaborate and alkali metal or alkaline earth metal ions, in particular $NaBO_2$, $Na_2B_4O_7$, $Ca(BO_2)_2$ or boric acid and NaOH or $Ca(OH)_2.H_2O_2$. The source of borate may be added in stoichiometric quantities for the in situ formation of the perborate. Alternatively, the molar ratio of borate, calculated as $BO_2^-$, to hydrogen peroxide may be reduced below the value of 1 if the total quantity of the source of borate and, if necessary, the source of alkali metal or alkaline earth metal ions is added at the beginning to the solution to be detoxified and $H_2O_2$ is added subsequently in one or more portions during the detoxication. The molar ratio of borate, calculated as $BO_2^-$, to $H_2O_2$ is preferably from 1:2 to 1:4.

When alkaline earth metal peroxides are used as peroxide compounds, these may be added in solid form, like the perborates, or produced in situ from $H_2O_2$ and a source of alkaline earth metal ions, such as $Ca(OH)_2$. The preferred alkaline earth metal peroxides are magnesium and calcium peroxides.

Among the peroxide compounds used in the process according to the invention, alkali metal percarbonates are particularly preferred, and among these especially sodium percarbonate of the formula $Na_2CO_3 \cdot 1.5\ H_2O_2$. When sodium percarbonate is used, detoxication can easily be carried out to residual cyanide contents below 0.1 mg/l, and the smaller quantity of percarbonate required and the reduced reaction time are added advantages. The percarbonate is most preferably added as a solid to the solution to be detoxified as the results of detoxication thereby obtained are significantly better than those obtained when percarbonate is added as a solution or formed in situ.

For sufficient perhydrolysis of the cyanohydrins and nitriles in the presence of manganese compounds, it is generally necessary to use at least two equivalents of active oxygen, preferably from 2.5 to 4 equivalents, per mol of cyanohydrin or nitrile. The optimum quantity of peroxide compound depends on the manganese content, the pH, the reaction temperature and the required residual cyanide contact but can easily be determined by orientating preliminary tests. Preferred pH values are from 9 to 11 and preferred temperatures are from 15° to 50° C. Conventional catalysts such as iodide, Cu, Ag and tungsten ions may be used, if desired, in the detoxication reaction. The process may be carried out continuously or batchwise. When the process according to the invention is carried out continuously, it may be controlled by means of the cyanide specific redox potential (according e.g. to U.S. Pat. No. 3,970,554).

It has hitherto been assumed that the quantity of peroxide compound used for detoxication of the cyanohydrins and nitriles must be significantly increased, regardless of the particular peroxide compound used, if decomposition catalysts such as in particular manganese compounds, which are well known to be extremely effective decomposition catalysts for hydrogen peroxide and other active oxygen compounds, are simultaneously present, even if in only small quantities, down to tenths of a ppm in the case of Mn. The selection of the peroxide compounds according to the invention has surprisingly enabled the detoxication process to be rendered not only more effective but also more economical. It was not foreseeable that the peroxide compounds to be used according to the invention, of which sodium percarbonate is an outstanding example, would be more effective than hydrogen peroxide in the presence of decomposition catalysts such as Mn compounds.

COMPARISON EXAMPLE 1

The solution to be detoxified contained:

1 g of cyanide/liter added as glycolonitrile and 5 mg of manganese/liter added as $MnSO_4$.

Peroxide compound: Hydrogen peroxide (50% by weight). Equivalents of active oxygen ($O_a$) per mol of cyanide.

| Time (min) | Temp. °C. | Course of the Reaction | | Remarks |
|---|---|---|---|---|
| | | pH | mg $CN^-$/l *) | |
| 0 | 24 | 9.5 | 1000 | |
| 5 | 26 | 9.1 | 539 | $H_2O_2$ decomposition |
| 15 | 27 | 9.2 | 365 | $O_a+$ |
| 30 | 27 | 9.3 | 438 | $O_a+$ |
| 45 | 27 | 9.3 | 395 | $O_a+$ |
| 60 | 27 | 9.3 | 369 | $O_a+$ |
| 90 | 27 | 9.4 | 343 | $O_a+$ |
| 120 | 26 | 9.4 | 310 | $O_a-$ |

*)Analytical method: argentometric titration

EXAMPLE 1

Solution to be detoxified: as in Comparison Example 1.

Peroxide compound: sodium perborate monohydrate added as solid

Equivalents $O_a$/mol of cyanide = 4.

| Time (min) | Temp. °C. | Course of the Reaction | | Remarks |
|---|---|---|---|---|
| | | pH | mg $CN^-$/l | |
| 0 | 24 | 9.5 | 1000 | |
| 5 | 27 | 10.4 | 328 | $O_a+$ |
| 15 | 28 | 10.4 | 216 | $O_a+$ |
| 30 | 28 | 10.4 | 190 | $O_a+$ |
| 45 | 28 | 10.4 | 164 | $O_a+$ |
| 60 | 27 | 10.4 | 159 | $O_a+$ |
| 90 | 27 | 10.4 | 150 | $O_a+$ |
| 120 | 26 | 10.3 | 150 | $O_a-$ |

EXAMPLE 2

Example 1 was repeated with the only difference that sodium perborate tetrahydrate was used instead of the monohydrate (added as solid: $O_a/CN=4$).

| Time (min) | Temp. °C. | Course of the Reaction | | Remarks |
|---|---|---|---|---|
| | | pH | mg $CN^-$/l | |
| 0 | 24 | 9.5 | 1000 | |
| 5 | 26 | 10.4 | 510 | $O_a+$ |
| 15 | 26 | 10.4 | 260 | $O_a+$ |
| 30 | 26 | 10.4 | 156 | $O_a+$ |
| 45 | 26 | 10.5 | 122 | $O_a+$ |
| 60 | 26 | 10.5 | 114 | $O_a+$ |
| 90 | 25 | 10.5 | 104 | $O_a+$ |
| 120 | 25 | 10.5 | 99 | $O_a-$ |

EXAMPLE 3

Solution to be detoxified: Same as Comparison Example 1.

Peroxide compound: Sodium percarbonate ($Na_2CO_3 \cdot 1.5\ H_2O_2$) added as solid.

Equivalents $O_a$/mol cyanide = 4.

| Time (min) | Temp. °C. | Course of the Reaction | | Remarks |
|---|---|---|---|---|
| | | pH | mg $CN^-$/l | |
| 0 | 24 | 9.5 | 1000 | |
| 5 | 26 | 10.6 | 114 | $O_a+$ |

-continued

| Course of the Reaction | | | | |
|---|---|---|---|---|
| Time (min) | Temp. °C. | pH | mg CN$^-$/l | Remarks |
| 15 | 27 | 10.7 | <0.1** | $O_a+$ |

**)Analysis according to DIN 38405, D13.

EXAMPLE 4

Example 3 was repeated with the only difference that the ratio of equivalents of $O_a$ per mol of cyanide was 3 (instead of 4).

| Course of the Reaction | | | | |
|---|---|---|---|---|
| Time (min) | Temp. °C. | pH | mg CN$^-$/l | Remarks |
| 0 | 24 | 9.5 | 1000 | |
| 5 | 25 | 10.6 | 210 | $O_a+$ |
| 15 | 26 | 10.7 | 19 | $O_a+$ |
| 30 | 26 | 10.7 | <0.1 | $O_a+$ |

EXAMPLE 5

Example 3 was repeated with the only difference that the ratio of equivalents of $O_a$ per mol of cyanide was 2 (instead of 4).

| Course of the Reaction | | | | |
|---|---|---|---|---|
| Time (min) | Temp. °C. | pH | mg CN$^-$/l | Remarks |
| 0 | 24 | 9.5 | 1000 | |
| 5 | 26 | 10.6 | 426 | $O_a+$ |
| 15 | 27 | 10.6 | 189 | $O_a+$ |
| 30 | 26 | 10.6 | 200 | $O_a+$ |
| 45 | 26 | 10.7 | 200 | $O_a-$ |

EXAMPLE 6

Solution to be detoxified: Same as Comparison Example 1.

Peroxide compound: Sodium percarbonate added as 13% by weight aqueous solution.

Equivalents of $O_a$/mol cyanide=3.

| Course of the Reaction | | | | |
|---|---|---|---|---|
| Time (min) | Temp. °C. | pH | mg CN$^-$/l | Remarks |
| 0 | 24 | 9.5 | 1000 | |
| 5 | 27 | 10.5 | 208 | $O_a+$ |
| 15 | 27 | 10.7 | 42 | $O_a+$ |

-continued

| Course of the Reaction | | | | |
|---|---|---|---|---|
| Time (min) | Temp. °C. | pH | mg CN$^-$/l | Remarks |
| 30 | 27 | 10.7 | 31 | $O_a-$ |

Further variations and modifications of the foregoing will be apparent to those skilled in the art and are intended to be encompassed by the claims appended hereto.

German priority application No. 41 10 056.5 is relied on and incorporated herein by reference.

We claim:

1. A process for the detoxification of an aqueous solution which contains a cyano compound which is a cyanohydrin or a nitrile and mixtures thereof each of said cyanohydrin and nitrile having 2 to 5 carbon atoms, whereby said cyanohydrin and nitrile is converted into the corresponding non-toxic hydroxycarboxylic acid or carboxylic acid, and which in addition contains a manganese compound, comprising carrying out a perhydrolysis reaction of 5° to 80° and a pH value of from 8 to 12, wherein said peroxide compound used for perhydrolysis is one or more peroxide compounds selected from the group consisting of alkali metal percarbonates and perborates of alkali metals and alkaline earth metals and alkaline earth metal peroxides, the said peroxide compound being added in solid form or dissolved or suspended in water to the solution to be detoxified or formed in situ in the said solution from hydrogen peroxide and a source of a metaborate and a source of an alkali metal or an alkaline earth metal or formed in situ from hydrogen peroxide and a source of an alkaline earth metal.

2. The process according to claim 1, wherein the solution to be detoxified contains a cyanohydrin.

3. The process according to claim 2 wherein said cyanohydrin is glycolonitrile.

4. The process according to claim 1, wherein the peroxide compound used for perhydrolysis is an alkali metal percarbonate.

5. The process according to claim 4 wherein said compound is sodium percarbonate of the formula $Na_2CO_3 \cdot 1.5 H_2O_2$.

6. The process according to claim 4, wherein the percarbonate is added in solid form to the solution to be detoxified.

7. The process according to claim 1, wherein peroxide compound is used in a quantity of at least two equivalents of active oxygen per mol of cyanohydrin.

8. The process according to claim 7 wherein from 2.5 to 4 equivalents of active oxygen per mol of cyanohydrin is used.

9. The process according to claim 1, wherein perhydrolysis is carried out at a pH value of from 9 to 11.

* * * * *